United States Patent [19]

Gore et al.

[11] 4,424,848

[45] Jan. 10, 1984

[54] POSITIONING PIN ASSEMBLY FOR A TIRE CHANGING MACHINE

[75] Inventors: Dennis L. Gore, Nashville; Dennis H. Patterson, Murfreesboro, both of Tenn.

[73] Assignee: Sun Electric Corporation, Crystal Lake, Ill.

[21] Appl. No.: 344,647

[22] Filed: Feb. 1, 1982

[51] Int. Cl.³ .............................................. B60C 25/06
[52] U.S. Cl. ................................................. 157/1.28
[58] Field of Search ................... 157/1.17, 1.24, 1.26, 157/1.28, 14

[56] References Cited

U.S. PATENT DOCUMENTS

| 2,481,926 | 9/1949 | Henderson | 157/14 |
| 3,742,999 | 7/1973 | Myers, Jr. | 157/1.28 |
| 4,039,016 | 8/1977 | Cunningham | 157/1.28 |
| 4,335,772 | 6/1982 | Bubik et al. | 157/1.28 |

Primary Examiner—James G. Smith
Attorney, Agent, or Firm—Allegretti, Newitt, Witcoff & McAndrews, Ltd.

[57] ABSTRACT

An improved positioning pin assembly for a tire changing machine is disclosed, including a positioning pin operable in an adjustable latched state and an extended, adjustable biased state.

5 Claims, 3 Drawing Figures

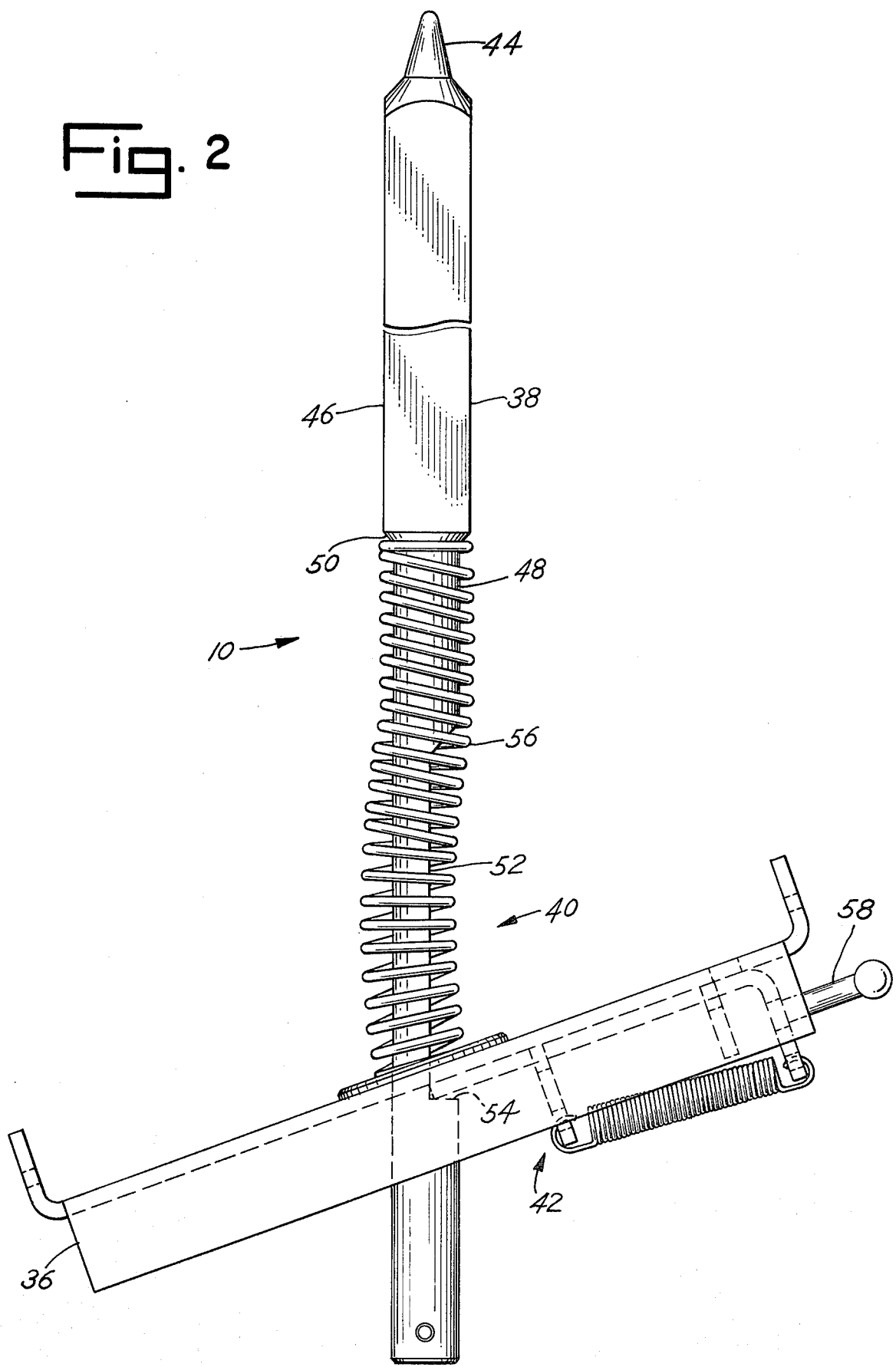

POSITIONING PIN ASSEMBLY FOR A TIRE CHANGING MACHINE

BACKGROUND OF THE INVENTION

The present invention relates generally to an automatic tire changing machine and more particularly to the positioning pin thereof.

Automatic tire changing machines are presently available in numerous configurations. Generally the wheel assembly, i.e., the rim and tire, is mounted on a platform in a substantially horizontal orientation. The wheel assembly is secured about a rotatable shaft which extends through the central aperture of the rim.

Thereafter the machine is actuated and two shoes engage and loosen the tire beads. A mount/dismount tool is mounted on the rotatable shaft and inserted between the rim and tire bead. Rotation thereof lifts the tire bead over the rim, providing the desired separation.

To eliminate the possibility of wheel or rim rotation as the shaft and mount/dismount tool rotate, the majority of automatic tire changing machines include a positioning pin. This pin is generally installed at a single, maximum preset height above the wheel-supporting platform of the tire changing machine. The pin extends through the wheel-supporting platform and engages one of the lug holes in the rim.

The lug holes are located in the rim web. The distance between the rim web and the platform of the tire changer (referred to as rim offset) varies substantially from wheel assembly to wheel assembly. For example, the distance for a Volkswagen "Bug" wheel assembly is substantially less than that for a Buick "Electra" wheel assembly. On rims with an offset greater than the standard installed height of the positioning pin, a seperate positioning pin extension is generally placed over the positioning pin to increase its effective height.

SUMMARY OF THE INVENTION

In a principal aspect, the present invention is an improved positioning pin assembly which permits the height of the positioning pin to be adjusted. As such, the automatic tire changing machine is far more universal.

The improved assembly includes frame means for affixing the assembly to the tire changer chassis, a positioning pin operable in a latched state and a biased state, spring means for biasing the pin into the biased state, and latch means for releasably retaining the pin in the latched state. In the latched state, the positioning pin extends above the chassis of the tire changing machine to a standard or conventional height of approximately four to six inches.

When the latch means is actuated to release the pin, the spring means urges the positioning pin into the biased state. There the height of the pin is substantially increased to approximately nine or ten inches. Further, the height of the pin, while in the biased state, can be adjustably reduced by a force counteracting the spring means.

Thus, the improved positioning pin assembly permits use of the automatic tire changing machine with any wheel assembly where the distance between the platform and the rim offset is within the height range of the positioning pin. That is, a platform-to-rim distance of approximately zero to ten inches can be accomodated.

It is thus an object of the present invention to provide an improved positioning pin assembly for an automatic tire changing machine. Another object is an improved pin assembly wherein the height of the positioning pin is adjustable without any seperate hardware (extensions, etc), and without removing the rim and tire.

Still another object of the present invention is a positioning pin assembly wherein the pin is operable in a latched state and a biased state. It is also an object to provide a positioning pin assembly operable in a biased state wherein the height of the pin is adjustable.

These and other objects, features and advantages of the present invention are set forth or apparent in the following description of a preferred embodiment.

BRIEF DESCRIPTION OF THE DRAWING

A preferred embodiment of the present invention is described herein with reference to the drawing wherein:

FIG. 2 is a schematic diagram of the improved positioning pin assembly as incorporated into the tire changer shown in FIG. 1.

DETAILED DESCRIPTION OF A PREFERRED EMBODIMENT

Figure 1:
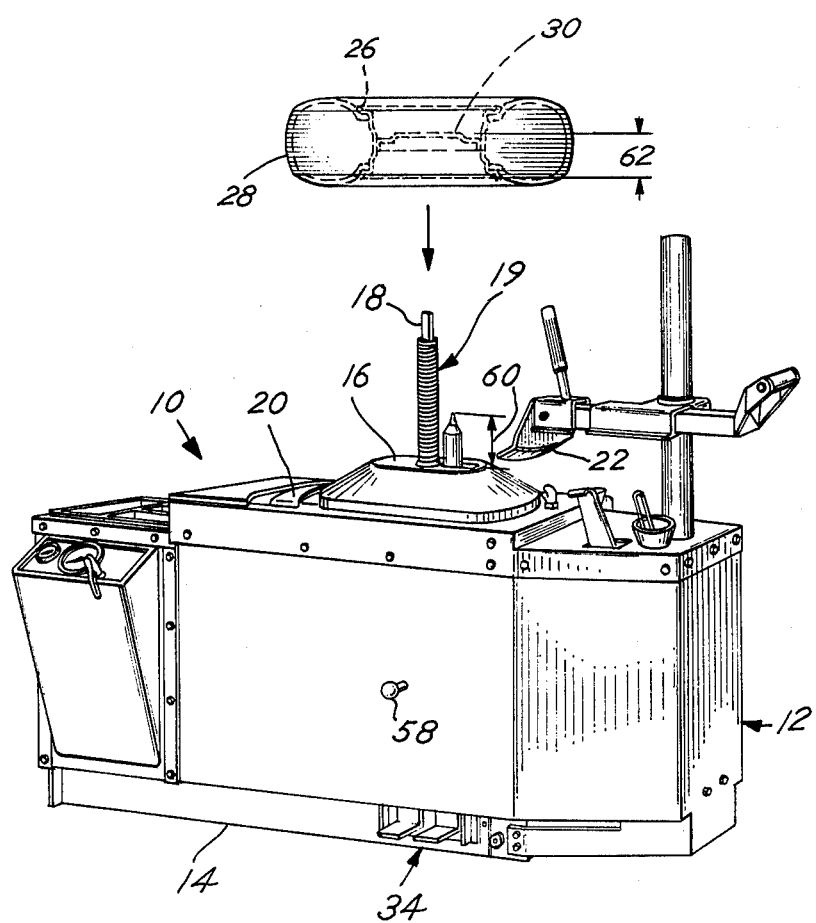
FIG. 1 is a perspective view of an automatic tire changing machine, including the improved positioning pin assembly.
Figure 3:
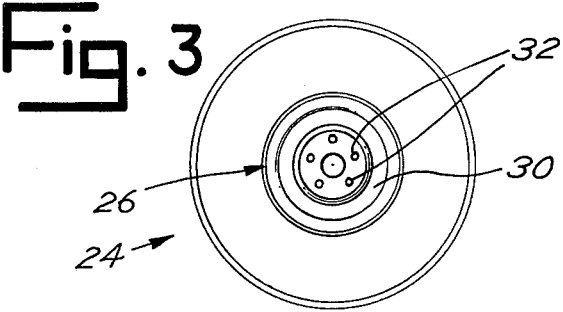
FIG. 3 is a plan view of the tire and rim assembly shown in FIG. 1.

Referring to FIGS. 1, 2 and 3, a preferred embodiment of the present invention is shown as an improved positioning pin assembly, generally designated 10. The improved pin assembly 10 is incorporated into an automatic tire changing machine 12.

The tire changing machine 12 has a frame or chassis, generally designated 14, a wheel-supporting platform 16, a rotatable central shaft 18, and a threaded tube 19 surrounding the central shaft 18. The tire changing machine 12 further includes a lower shoe 20 and an upper shoe 22, pneumatic-hydraulic operated to loosen the tire beads of a wheel assembly 24, including a rim 26 and tire 28. As best shown in FIG. 1, the rim 26 includes a rim web 30, defining a series of lug holes 32.

The wheel assembly 24 is placed on the platform 16 such that the rotatable central shaft 18 extends through the central aperture of the rim 26. A collar (not shown) is threadably mounted on the threaded tube 19 and tightened against the rim 26. Depression of a pedal 34 actuates the lower and upper shoes 20, 22 such that the bead of the tire 28 is loosened from the rim 26. Thereafter a mount/dismount tool (not shown) is mounted on the rotatable central shaft 18 and inserted between the rim 26 and tire 28. In addition, the depression of the pedal 34 causes the central shaft 18 and mount/dismount tool to rotate and thereby separate the tire 28 from the rim 26.

Referring to FIGS. 1, 2 and 3, the improved positioning pin assembly 10 includes frame means 36, a positioning pin 38, spring means 40 and latch means 42. The frame means 36 rigidly affixes and secures the pin assembly 10 to the chassis 14 of the automatic tire changing machine 12.

The positioning pin 38 extends through and above the platfrom 16 to engage one of the lug holes 32. The positioning pin 38, once engaged, prevents rotation of the wheel assembly 24 as the central shaft 18 and mount/dismount tool are rotated during the mounting and dismounting operations.

In this preferred embodiment, the positioning pin 38 includes a tip 44 adapted to engage the lug hole 32 and a shaft 46. The shaft 46 includes a recessed portion 48 defining a recess end wall 50. The recessed portion 48 of the shaft 46 further defines a notch 52 and a notch end wall 54, substantially opposite the tip 44. The shaft 46 extends through an opening in the frame means 36.

As more described below, the positioning pin 38 is operable in a latched state and in a biased state. In the latched state, the tip 44 of the pin 38 is held at a limited height 60 of approximately four to six inches above the platform 16. If the wheel assembly 24 is then placed over the central shaft 18 and on the positioning pin 38, the positioning pin 38 may be further depressed. In normal operation, the rim 28 will rest on the wheel support platform 16 and the positioning pin 38 will extend above the wheel support platform 16 to engage one of the lug holes 32 in the rim web 30.

In the biased state, the pin 38 extends approximately nine to ten inches above the platform 16. The height thereof is also adjustable, i.e., as in the latched state, the height in the biased state can be reduced by application of a downward force on the positioning pin 38.

The spring means 40 biases the positioning pin 38 to the heightened position of the biased state. In this preferred embodiment, the spring means 40 is a compression spring 56 adapted to receive the positioning pin 38. The compression spring 56 extends between and operates against the frame means 36 and the recess end wall 50 of the shaft recessed portion 48.

The latch means 42 releasably retains the positioning pin 38 in the latched state against the bias of the spring means 40. As shown, the latch means 42 includes a spring-biased handle 58. The handle 58 is slideably secured to the frame means 36, opposite the compression spring 56. The handle 58 extends through the chassis 14 of the tire changing machine 12 to provide access thereto, as best shown in FIG. 1.

The spring-biased handle 58 is adapted to engage the notch 52, or more particularly, the notch end wall 54. So engaged, the latch means 42 retains the positioning pin 38 in the latched state.

Activation of the latch means 42 disengages the handle 58 from the notch 52. With disengagement, the spring means 40 moves the positioning pin 38 upwardly, i.e., biases the positioning pin 38 into the extended biased state.

The positioning pin 38 will be returned to the latched state upon being depressed below the limited height 60. Thus, if the wheel assembly 24 has an offset 62 less than the limited height 60 and the wheel assembly 24 is placed on the positioning pin 38, the positioning pin 38 will move to a latched state.

As noted earlier, the height of the tip 44 above the platform in the biased state can be reduced. Reduction is achieved by a downward force on the postioning pin 38, causing compression of the spring 56. This force will usually be applied through the wheel assembly 24 as it is mounted on and secured to the automatic tire changing machine 12.

As such, the positioning pin 38 of the tire changer 12 will accommodate different tire sizes and different rim configurations, without additional parts or the time necessary to add such parts. The only requirement is that the rim offset distance 62 fall within the range of pin heights.

A single preferred embodiment of the present invention has been described. It is to be understood, however, that changes and modifications can be made without departing from the true scope and spirit of the present invention, as defined by the following claims.

What is claimed is:

1. In a tire changing machine of the type having a chassis and a wheel-supporting platform, an improved positioning pin assembly comprising, in combination:
   frame means for securing said improved positioning pin assembly to said chassis;
   a positioning pin operable in a latched state and a biased state, said positioning pin engaging said frame means and extending through said wheel-supporting platform to a height, said height being greater in said biased state;
   spring means for biasing said positioning pin into said biased state; and
   latch means for releasably retaining said positioning pin in said latched state against the bias of said spring means;
   whereby said height of said positioning pin above said wheel-supporting platform is selectively adjustable.

2. An improved positioning pin assembly as claimed in claim 1 wherein said spring means is a compression spring.

3. An improved positioning pin assembly as claimed in claim 2 wherein said compression spring receives said positioning pin.

4. An improved positioning pin assembly as claimed in claim 1 wherein said latch means is a spring-biased handle.

5. An improved positioning pin assembly as claimed in claim 4 wherein said spring-biased handle engages said positioning pin in said latched state.

* * * * *